United States Patent
Kolatorowicz et al.

[15] 3,671,836
[45] June 20, 1972

[54] POWER CONVERSION CONTROL SYSTEM

[72] Inventors: Edwin E. Kolatorowicz, Erie; Werner K. Volkmann, Fairview, both of Pa.

[73] Assignee: General Electric Company

[22] Filed: March 31, 1971

[21] Appl. No.: 129,844

[52] U.S. Cl..................................318/345, 321/5, 321/47
[51] Int. Cl................................................H02p, H02m 7/00
[58] Field of Search..........................321/5, 18, 47; 318/345

[56] References Cited

UNITED STATES PATENTS

| | | | |
|---|---|---|---|
| 3,584,286 | 6/1971 | Randall | 321/47 X |
| 3,281,645 | 10/1966 | Spink | 321/47 |
| 3,399,337 | 8/1968 | Stone | 321/5 |

Primary Examiner—William H. Beha, Jr.
Attorney—James C. Davis, Jr., George R. Powers, Frank L. Neuhauser, Oscar B. Waddell and Joseph B. Forman

[57] ABSTRACT

A static power conversion system for converting alternating current electric power to direct current power by means of controllable rectifiers is provided with control apparatus for controlling the firing angle of the controlled rectifier. The control apparatus generates a command signal proportional to a desired level of direct current power output, internal signal trains at various frequencies and timings determined at least in part by the frequency of the alternating current input wave form and the magnitude of the command signal, and output trains of firing pulses for delivery to the controllable rectifiers, the timing of the firing pulses being determined by the magnitude of the control signal.

7 Claims, 6 Drawing Figures

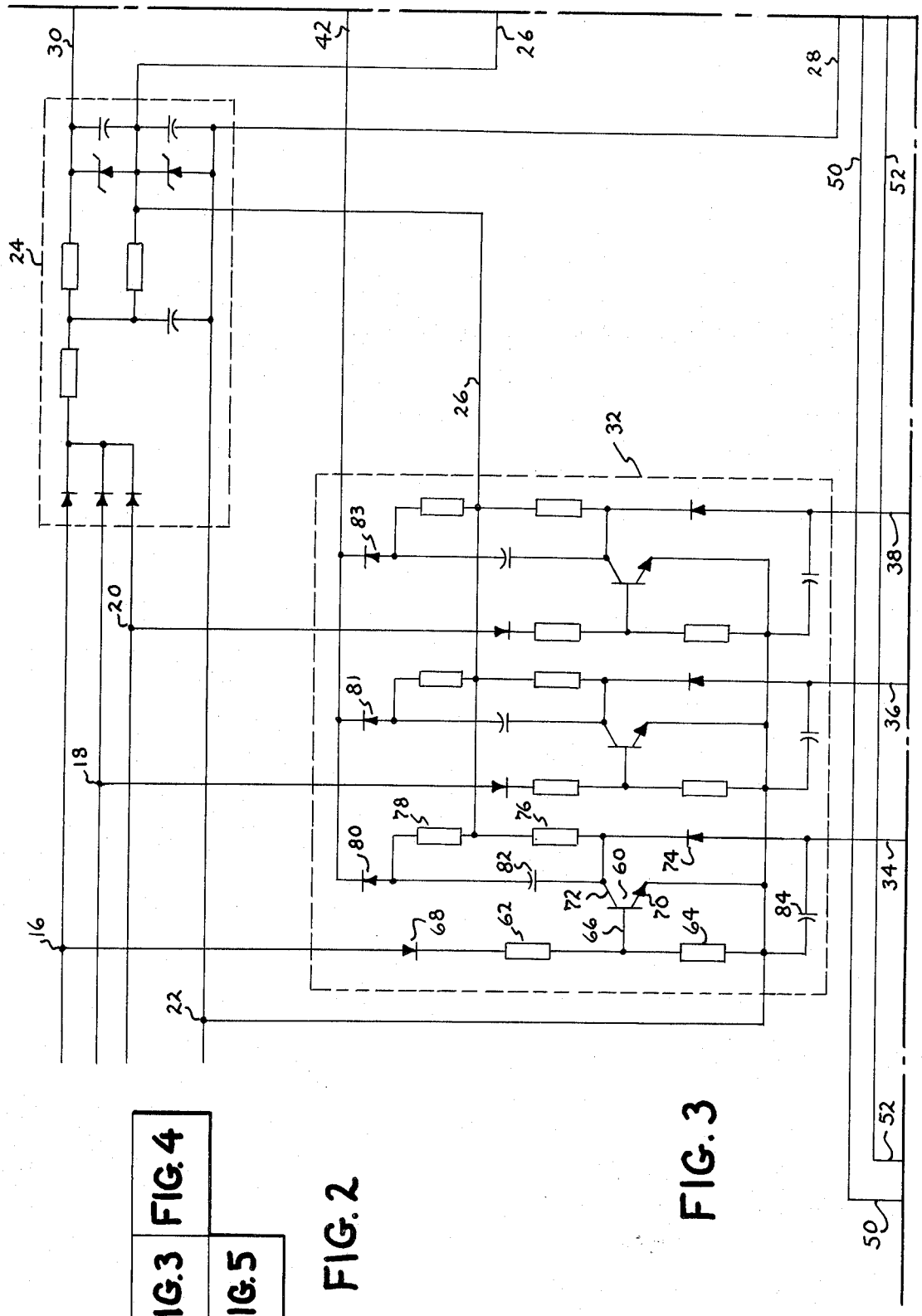

POWER CONVERSION CONTROL SYSTEM

BACKGROUND OF THE INVENTION

The present invention relates to a control system for governing the amount of conduction of controllable rectifiers which in turn control the flow of power from an a-c supply to a d-c load. More specifically, the present invention relates to a simplified and improved firing control system for controllable rectifiers.

Among the better known systems for supplying varying amounts of d-c power by conversion from a-c power are those which employ controllable rectifiers located between an a-c supply and a d-c load. Included in the family of controllable rectifiers are, for example, such devices as thyratrons, ignitrons and silicon controlled rectifiers. Silicon controlled rectifiers are also known as SCR's and thyristors. Controllable rectifiers possess the capability of governing the amount of power transferred through them from an a-c supply to a system d-c load. This metering function is obtained by varying the duration of conduction of the controllable rectifiers. The duration of conduction of the controllable rectifiers is determined by the point during an a-c wave form at which they are initiated into conduction. This point is commonly known as a firing angle and is controlled by circuitry often referred to as firing circuits.

Firing circuits perform a multiplicity of functions including the generation of suitable firing signals or pulses in response to a command signal and the proper distribution of those pulses to control electrodes of the controllable rectifiers. Controllable rectifiers have two prerequisites which must be fulfilled if they are to be conductive. The first major prerequisite, characteristic of rectifiers in general whether controllable or not, is the presence of a forward bias on anode-cathode power connections. A second prerequisite, applicable to controllable rectifiers, is the provision of a firing signal at a control electrode during the interval of the forward bias on the power connections. Conductivity of a controllable rectifier, once established by fulfillment of these two prerequisites, persists as long as the forward bias is sufficient to maintain a current larger than the rectifier holding current. Conduction will stop when the forward bias drops below that level required to maintain the rectifier holding current.

The command signal previously mentioned normally bears a proportionality to the amount of power transferral desired through the controllable rectifiers and hence also to the firing angle required to achieve the desired amount of power transferral. Thus, it is clear that a controlling firing circuit must be properly related to the wave form of the a-c supply and be capable of shifting the firing angle at which the firing signals are delivered to the control electrodes of the controllable rectifiers.

Many varieties of firing circuits of both analog and digital types are in use. These firing circuits successfully govern controllable rectifiers in many different applications. A majority of the applications employ a three-phase a-c power supply. Use of a single phase supply is not uncommon if the amount of power to be transferred through the controllable rectifier assembly is not excessive.

The majority of polyphase firing circuits currently in use are rather complex. To maintain balanced operation of the various phases over the range of phase control it is necessary to provide adjustment in the circuit or to use precision components. These considerations lead to a relatively high cost circuit which is difficult to service, maintain, and package.

SUMMARY OF THE INVENTION

It is, therefore, an object of the instant invention to provide an economical system to govern the rate of conversion of a-c power to d-c power through controllable rectifiers under the control of a firing circuit which requires neither adjustability nor selected or precision components.

It is also an object of the instant invention to provide a reliable controllable rectifier firing circuit which is simple and easily understood.

Another object of this invention is to provide a firing circuit which lends itself to ease of servicing as well as to a more compact structure than is possible with more conventional firing circuits.

Yet another object of this invention is to provide a firing circuit for controllable rectifiers for accurately and simply performing the normally complex functions of timing and distribution of firing signals to controllable rectifiers.

Still another object of this invention is to accomplish the foregoing objectives at the minimum cost consistent with the level of quality needed for the safe, accurate control of controllable rectifiers.

Briefly stated, and in accordance with one aspect of this invention, a simplified firing circuit is provided to produce firing pulses variable by a command signal, for controlling the conduction of associated controllable rectifiers. Included in the firing circuit to initiate the firing pulse production is a signal generator. The signal generator provides trains of output signals. These signals recur at a multiple of the frequency of the a-c power source and are displaced from synchronism with the wave form of the a-c power source, in the signal generator, by an interval which is proportional to the magnitude of the command signal. When the command signal is adjusted over its full range, the conductivity of the associated controllable rectifiers is varied over its full range from zero to the theoretical maximum. Since each of the associated controllable rectifiers is fired under the control of these same trains of signals, balanced operation can be achieved without adjustments or matched components. In the absence of a command signal the signal generator inhibits its output signals and firing pulses are not delivered to the controllable rectifiers.

In accordance with another aspect of this invention a signal distributing or directing unit processes the trains of output signals from the aforementioned signal generator and through its response to other signals, introduced in the form of channel trains, directs firing pulses to the controllable rectifiers. The trains of channel signals introduced into the signal distributing unit are equal in number to the quantity of separately controlled controllable rectifiers, and the signals therein are derivatives of and in synchronism with the wave form of the a-c power source. In combination in the signal distributing unit logic system, the output signals of the signal generator and the signals of the channel trains establish the sequence and firing angle of the firing pulses delivered from the distribution unit to the controllable rectifiers. The distribution of the firing pulses is not solely a function of the a-c power wave forms since the firing zones must overlap to yield the higher rates of power conversion from polyphase a-c sources to pulsating d-c power. Confining the pulses to individual controllable rectifiers to non-overlapping firing zones will not allow control of power flow over the full theoretical range, therefore the distribution must be made a function of the desired firing angle.

The specification concludes with claims particularly pointing out and distinctly claiming the subject matter of this invention. The organization and manner of making and using this invention together with further objects and advantages of this invention may be best understood by reference to the following description taken in conjunction with the accompanying figures.

BRIEF DESCRIPTION OF THE FIGURES

FIG. 2 is a map of the relative placement of FIGS. 3, 4 and 5.

FIG. 3 shows details of a signal synchronizing unit.

An identification number assigned to any part or portion of a figure identifies that same part or portion in whatever figure that number appears.

DETAILED DESCRIPTION OF THE FIGURES

Figure 1:
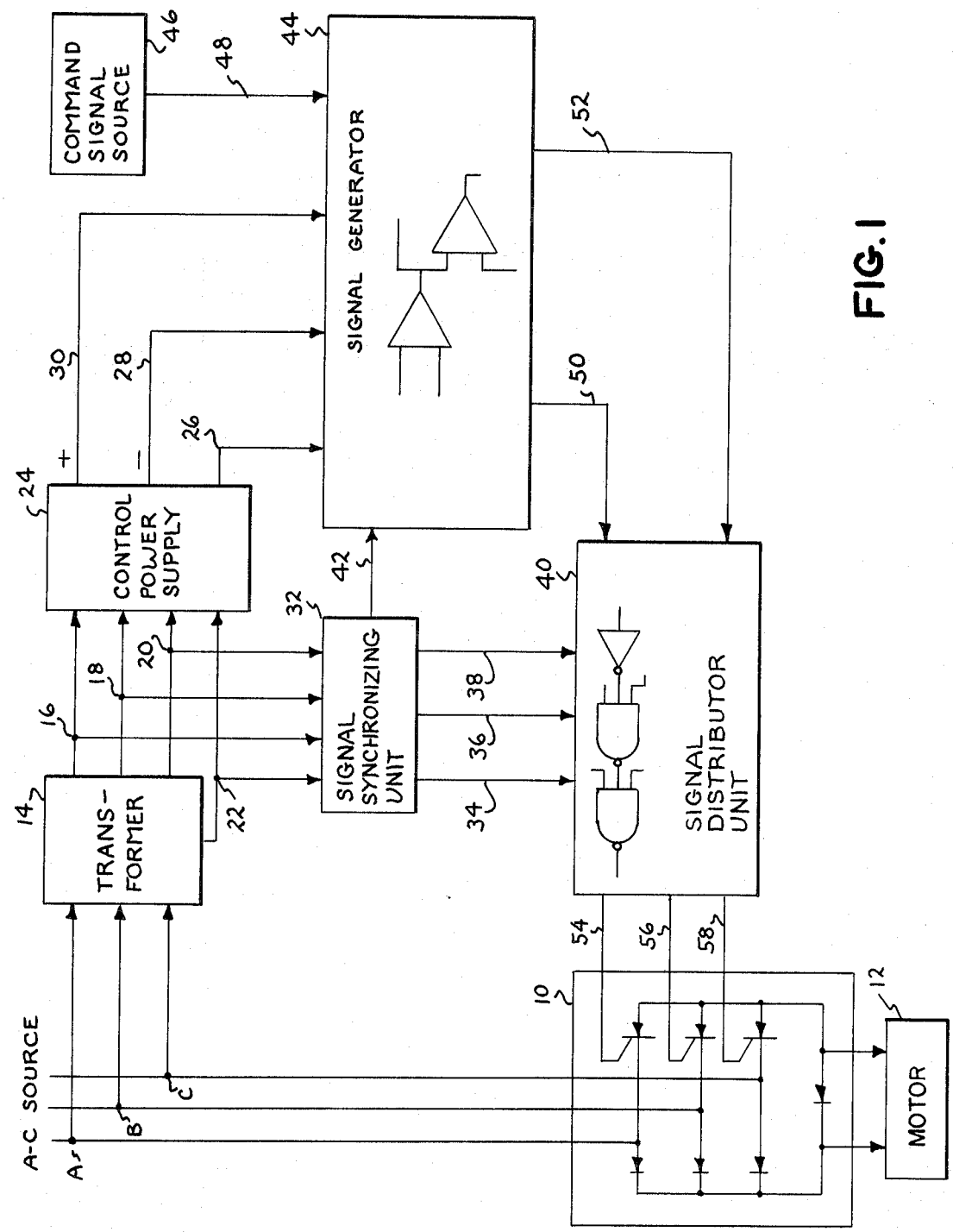
FIG. 1 is a block diagram of a controllable rectifier control system incorporating the instant invention.

FIG. 1 shows in block diagram form the utilization of a three-phase a-c source as a power supply which, when rectified, furnishes power to a d-c load. Although no closed-loop regulating functions are shown, their application being well known in the art, components such as those depicted lend themselves equally well to closed-loop control system operation.

In the preferred embodiment shown in FIG. 1, a rectifier unit 10 is interposed between the a-c source and a load 12, the load 12 typically being a d-c motor as illustrated. The rectifier unit 10 includes controllable rectifiers governed by other system components to control the power transfer between the a-c source and the load 10.

An optional transformer 14, as shown, functions to reduce the voltage level in components of the control system and to isolate those components from the a-c source. The transformer 14 may also be employed to furnish a convenient means of changing from a three wire, three-phase a-c distribution system to a four wire system when a voltage-to-neutral is desired. The transformer 14 is selected to provide the control components their power requirements at an appropriate voltage level on its three-phase output leads 16, 18 and 20 and its neutral lead 22.

In the embodiment illustrated, a control power supply 24 includes rectifying, filtering and voltage regulating components. These furnish d-c power at two different voltage levels with respect to a common bus 26. The d-c output voltage polarities — negative and positive — are present, respectively, on interconnections 28 and 30.

A signal synchronizing unit 32 is similarly interconnected with the transformer 14 three-phase output leads 16, 18 and 20 as well as with the neutral lead 22. Through its three connections 34, 36 and 38 to a signal distributor unit 40 and its connection 42 to a signal generator 44, the signal synchronizing unit 32 furnishes phase relationship information to the aforementioned functional components. That is, the signal synchronizing unit 32 indicates to the signal generator 44 and the signal distributor unit 40 the prevalence of forward bias on a controllable rectifier. Additionally, the signal synchronizing unit 32 identifies that phase in which the forward bias on the controllable rectifier exists, and enables the signal distributor unit 40 accordingly.

The signal generator 44, in addition to its connections to the control power supply 24 and the signal synchronizing unit 32, is interconnected with command signal input source 46 through a lead 48. A command signal is introduced through the lead 48 into the signal generator 44 wherein a plurality of ramp-type signals are produced. In an advantageous arrangement of amplifiers, the command signal is combined with the ramp-type signals to produce block signals. The command signal which is of variable magnitude provides a proportional phase shift of the block signals with respect to the a-c source wave form. Since the magnitudes of the phase shift and the command signal are proportional, the command signal is enabled to control the firing angle of the associated controllable rectifiers in the rectifier unit 10. This control of the firing angle by the command signal invests control of the rate of power transfer from the a-c source to the load 12 in the command signal.

The command signal input source 46 yields the aforementioned command signal the magnitude of which is a variable indicative of the desired power transfer to the load 12. More particularly, the command signal typically provides a motor speed reference level. This command signal may be derived from a manually operated device, from a process controller, or another analog-type signal source. A comparison of a reference signal with a feedback signal in a closed-loop system may be employed as a command signal. If digital techniques are employed elsewhere in the system, a digital-to-analog converter may be incorporated to furnish a command signal compatible with the needs of the signal generator 44. Two output connections 50 and 52 conduct the signals developed in the signal generator 44 to the signal distributor unit 40.

The signal distributor unit 40 simultaneously processes the signals delivered to it from the signal generator 44 and the phase relationship information developed in the signal synchronizing unit 32. As a result of this simultaneous processing, the signal distributor unit 40 yields pulse trains on its output connections 54, 56 and 58. Dependent upon the requirements of the rectifier unit 10, the pulses forming the pulse trains may suffice as firing signals for those controllable rectifiers in the rectifier unit 10. If the pulses lack the necessary characteristics, an amplifier, well known in field of controllable rectifier art, may be employed between the signal distributor unit 40 and the rectifier unit 10. Firing pulses derived either directly from the signal distributor unit 40 or through an appropriate amplifier are connected to the control electrodes of the controllable rectifiers in the rectifier unit 10 on a per-phase basis. As mentioned in the "Background," proper phasing is a requirement to fulfill the prerequisites for the firing of a separately controlled controllable rectifier into conductivity. By "separately controlled controllable rectifier" is meant one or more simultaneously fired controllable rectifiers.

The control system of FIG. 1 is directed to governing the power transfer from the a-c source to the load 12. To this end, most of the system is, in turn, provided for the purpose of generating and distributing timely firing signals for the controllable rectifiers in the rectifier unit 10. The three-phase transformer 14 reduces the a-c source voltage to the desired level and provides the neutral lead 22 for reference purposes. The control power supply 24 rectifies a portion of the output of the transformer 14 for use in the system as d-c bias voltage. The signal synchronizing unit 32, also connected to the output of the transformer 14, develops phase relationship information to enable the signal distributor 40 to properly direct its outputs to controllable rectifiers in the rectifier unit 10. The signal generator 44 responds to signals from the command signal source 46 and the signal synchronizing unit 32 to yield trains of signals which are phase shifted proportionally to the magnitude of the command signal. The signals in the signal trains, in accordance with the previously mentioned phase relationship information, are processed in the signal distributor unit 40. Logic included in the signal distributor unit 40 channels the firing signals to the proper controllable rectifiers in the rectifier unit 10 as enabled by the channel signals in accordance with phase rotation of the a-c source. This same logic performs discrimination and prevents distribution of the firing signals to controllable rectifiers which, if fired at that instant, would permit the flow of damaging current.

A subsequent and detailed discussion of the operation of the control system treats further of the interrelationships and contributions of the functional blocks. A description of the other figures will facilitate the understanding of any operational discussion.

Figure 4:
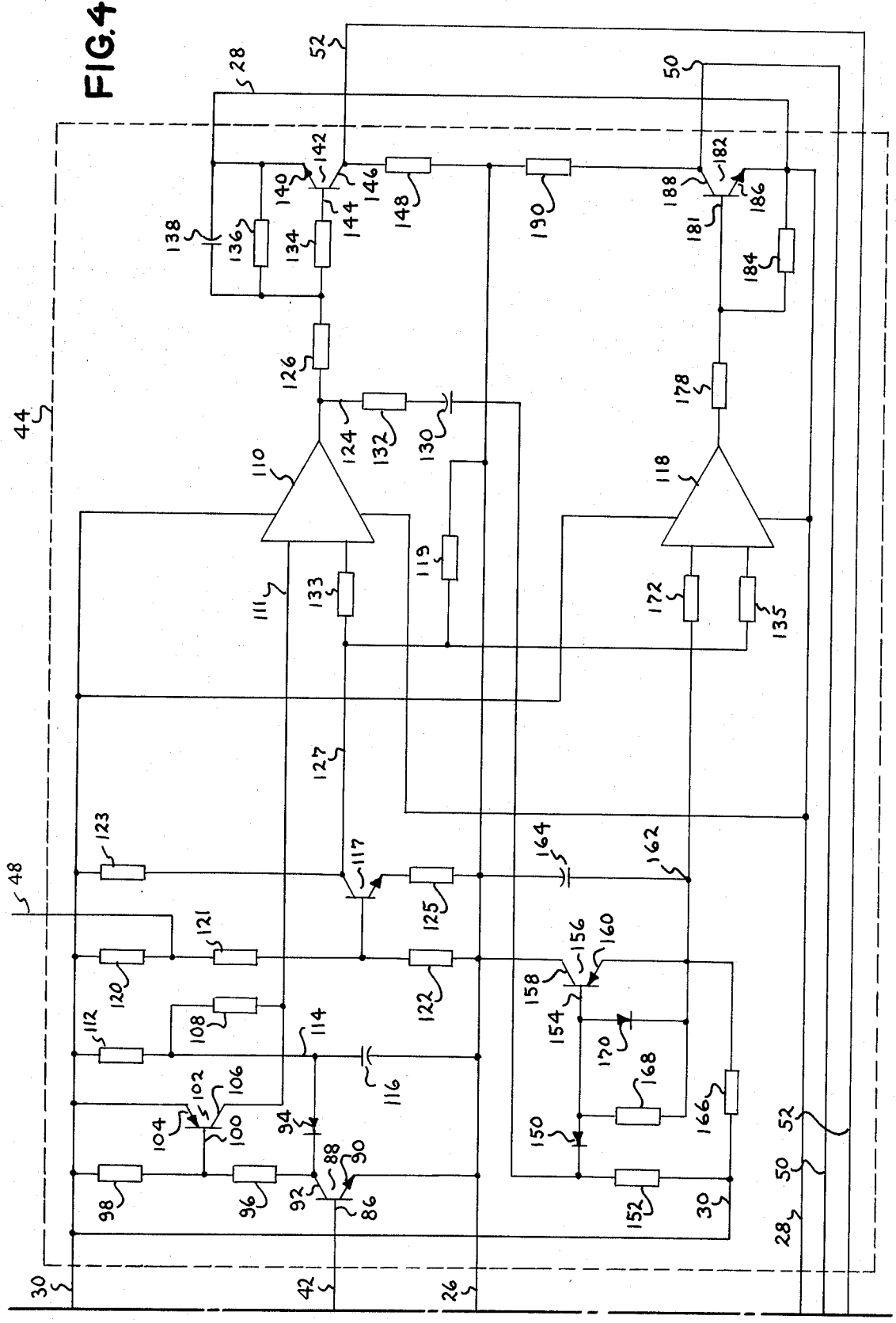
FIG. 4 is a detailed diagram of a signal generator in accordance with the invention herein disclosed.
Figure 5:
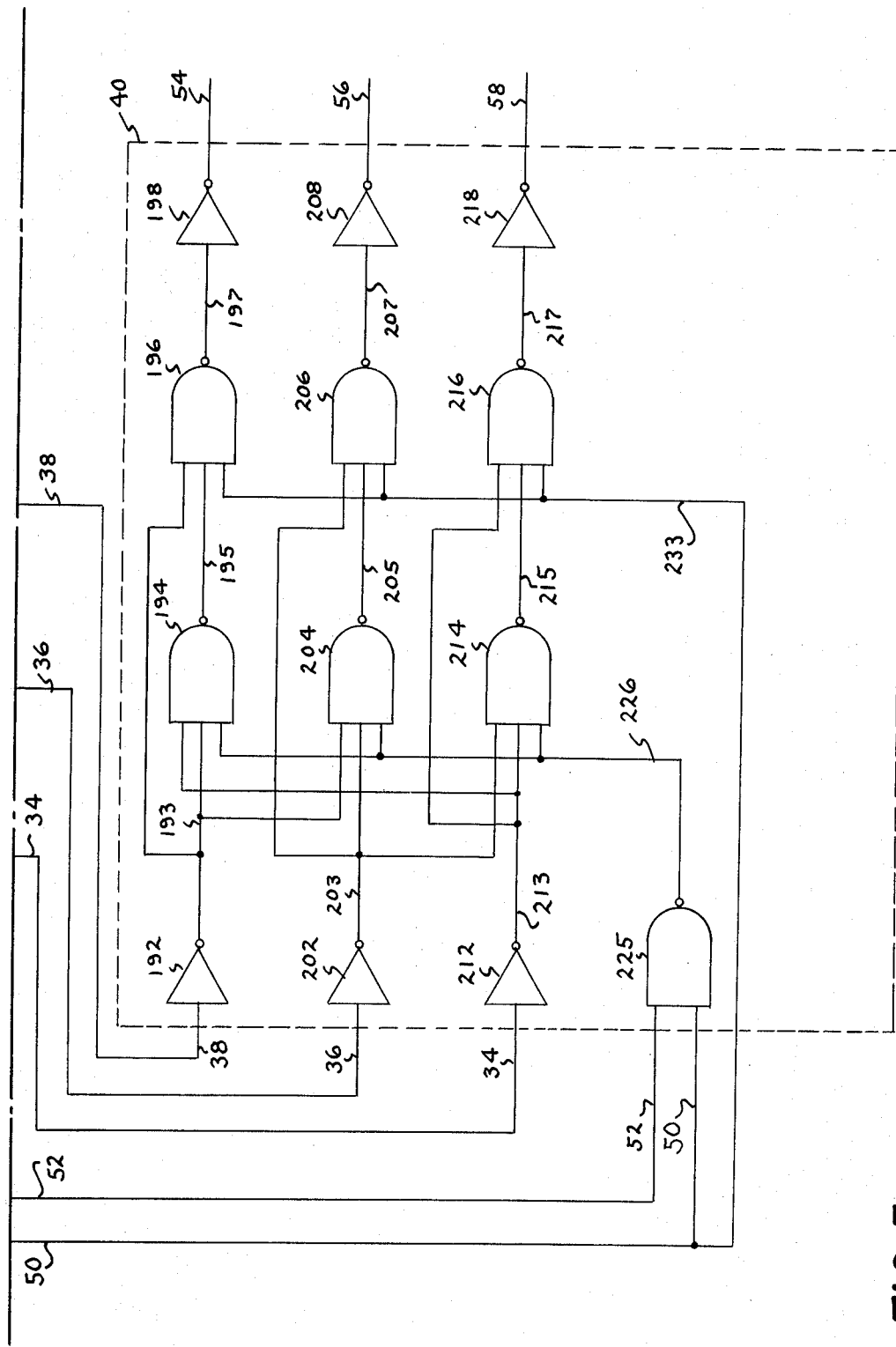
FIG. 5 is a detailed diagram of a signal distributor, in accordance with the present invention, responsive to output signals developed in the signal generator of FIG. 2, and to channel signals generated in the signal synchronizing unit of FIG. 3.

FIG. 2 shows the relative placement of FIGS. 3, 4 and 5 to properly relate the various inputs and outputs. This alignment combined with the identification numbers as they appear in the various figures will serve to indicate the proper interconnections between the functional units.

FIG. 3 shows in detail the signal synchronizing unit 32 of FIG. 1. Since this unit 32 derives its inputs from the transformer 14 it is able to establish phase relationship information required by the signal generator 44 and the signal distributor unit 40. A connection 42 transfers information from the signal synchronizing unit 32 to the signal generator 44 to establish the operating frequency thereof. Connections 34, 36 and 38, interconnecting the signal synchronizing unit 32 with the signal distributor unit 40, convey a-c source phase rotation information and controllable rectifier bias information from the former to the latter to control firing pulse delivery to the controllable rectifiers in the rectifier unit 10.

Returning to FIG. 3, it will be noted that for each phase of the transformer 14 output, identifiable by the leads 16, 18 and 20, the circuitry and components are identical. Though the following description is given in terms of only one of the phases, it applies equally to all others.

A transistor 60 of the NPN type has an input bridge of first and second resistors 62 and 64, respectively, connected at its center to the base electrode 66 of the transistor 60. A diode 68 selectively energizes the bridge when a predetermined relationship exists between the voltages of the phase lead 16 and the neutral lead 22. From this input and its counterparts in other circuits the signal synchronizing unit 32 develops phase relationship information. The emitter 70 of the transistor 60 connects to the neutral lead 22 as a reference point while the collector 72 of the transistor 60 is connected to three circuits.

A first circuit includes a rectifier 74 interposed between the collector 72 and the output connection 34 of the signal synchronizing unit 32. A second circuit connects the common bus 26 and the collector 72 of the transistor 60 through a first output resistor 76. A second output resistor 78 and a diode 80 coupled to the output connection 42 of the signal synchronizing unit 32 make up a third circuit. This third circuit conveys phase data to the signal generator 44 and in combination with its counterparts develops a first train of signals. A capacitor 82 parallels the first output resistor 76 in its series connection with the second output resistor 78. A capacitor 84 is connected between the neutral lead 22 and the output connection 34.

A later discussion of the operation of the signal synchronizing unit 32 will further point out those functions attributable to its components.

Also shown in FIG. 3 is the control power supply 24 of FIG. 1. No detailed discussion or description is included, since it is a function well known of a design familiar to those involved in the art.

FIG. 4 is a detailed diagram of the signal generator 44 of FIG. 1. It will be noted that the common bus 26 as well as the negative and positive interconnections 28 and 30, respectively, are introduced from the control power supply 24. The connection 42 introduces phase relationship information in the first train of signals from the signal synchronizing unit 32 and the lead 48 delivers the command signal from the command signal input source 46. The output connections 52 and 50, respectively, conduct the signals of second and third trains of signals developed in the signal generator 44 to the signal distributor unit 40.

The signals of the second and third trains, produced in the signal generator of FIG. 4, are ultimately used for control of the controllable rectifiers after processing in the signal distributor unit 32 of FIG. 1. First and second amplifiers, 110 and 118, respectively, are indicated in FIG. 4. Together with their ramp generators, including the transistors 88 and 156, and their output stages, including the transistors 142 and 182, the amplifiers 110 and 118 respond to their inputs to yield trains of signals. In the illustrated embodiment, the signals of each of the trains of signals are capable of being phase-shifted by the command signal introduced on lead 48. Generation of the two ramps and the resultant signals enables a cumulative phase shift of up to 180 electrical degrees in the signals of the third train of signals. The extent of the actual phase shift is essentially proportional to the level of the command signal.

The connection 42 from the signal synchronizing unit 32 is established at the base electrode 86 of a transistor 88 of the NPN type. Signals introduced through the connection 42 establish the operating frequency of the ramp and signal circuits included in the signal generator of FIG. 4. The emitter 90 of the transistor 88 connects directly to the common bus 26, while the collector 92 of the transistor 88 is connected to a diode 94 and a resistor 96. A resistor 98 in series with the resistor 96 couples the base electrode 100 of a transistor 102 to the positive interconnection 30. The emitter 104 of the transistor 102, of the PNP type, connects directly to the positive interconnection 30. The collector 106 of the transistor 102 is connected to a resistor 108 and to a first operational amplifier 110 by a lead 111. It is in the first amplifier 110 that the command signal is combined with a ramp signal to promote the development of a phase-shifted signal. A series circuit including a resistor 112, a lead 114 and a capacitor 116 connects the common bus 26 to the positive interconnection 30. The lead 114 also interconnects the previously unspecified terminations of the diode 94 and the resistor 108. By alternately discharging the capacitor 116 abruptly and recharging it more slowly, this circuit develops ramp-type signals on the lead 114.

The first operational amplifier 110 and a second operational amplifier 118 are standard units which are available commercially and hence are shown only symbolically. In the embodiment portrayed, both inputs, one of the inverting type and one of the non-inverting type, are employed with each amplifier. These will be discussed in later paragraphs.

The command signal from the command signal source 46, FIG. 1 is introduced into the signal generator 44 through the lead 48. A transistor 117 is governed by the command signal and, in turn, governs the first and second operational amplifiers 110 and 118, respectively, which are connected to the positive and negative interconnections 30 and 28. The magnitude of the command signal introduced on the lead 48 controls the phase shift of the outputs of the amplifiers 110 and 118.

The first operational amplifier 110 has an output connection 124 to output resistors 126 and 132. A capacitor 130 in series with the resistor 132 yields a first output signal. A second output to the resistor 126 feeds resistors 134 and 136, and a capacitor 138. The resistor 136 and the capacitor 138 together with the emitter 140 of a transistor 142 are connected to the negative interconnection 28. The base 144 of the transistor 142 connects to the resistor 134 while the collector 146 of the transistor 142 is coupled directly to the output connection 52 and through a resistor 148 to the common bus 26. This circuitry utilizes the phase-shifted output of the first amplifier 110 to generate the signals of the second train of signals. Those signals are similarly phase-shifted, and occur on the output connection 52.

The first output of the first operational amplifier 110 is connected through the resistor 132 and the capacitor 130 to a diode 150 and through a resistor 152 to the positive interconnection 30. A negative-going value on the output connection 124 passes through the resistor 132, the capacitor 130 and the diode 150 to the base 154 of a transistor 156 of the PNP type. The collector 158 of the transistor 156 is connected to the common bus 26 while the emitter 160 is connected to a lead 162. The lead 162 is isolated from the common bus 26 by a capacitor 164 in parallel with the collector-emitter (158–160) junction of the transistor 156. A resistor 166 is interposed between the lead 162 and the positive interconnection 30. A resistor 168 and a diode 170 are connected in parallel with the base-emitter (154–160) junction of the transistor 156 to provide bias. A resistor 172 connects the lead 162 to an input of the second operational amplifier 118. The phase-shifted output of the first operational amplifier 110 thus provides for a phase-shifted ramp input on the lead 162 to the second operational amplifier 118.

The second operational amplifier 118 is equipped with an output resistor 178 to which a doubly phase-shifted signal is imparted. This signal connects to the base 181 of a transistor 182 of NPN type and to a resistor 184. The resistor 184 parallels the base-emitter (180–186) junction of the transistor 182, and together with the emitter connection 186 of the transistor 182 is coupled to the negative interconnection 28. The collector 188 of the transistor 182 becomes another signal generator 44 output on connection 50. A resistor 190 connects the collector 188 and the connection 50 to the common bus 26. The transistor 182 impresses a train of signals on the output connection 50, producing the third train of signals. These signals incorporate the double phase shift previously mentioned, when the command signal is a maximum.

Considering FIG. 5, the signal distributor unit 40 of FIG. 1 in detail, it will be noted that the two outputs 50 and 52 of the signal generator 44 and the three outputs 34, 36 and 38 of the signal synchronizing unit 32 comprise the inputs. In the subsequent discussion of the operation of the signal distributor unit with reference to FIG. 5, the behavior of the logic functions shown in FIG. 5 is described.

The three channel signal inputs 34, 36 and 38 from the signal synchronizing unit 32 are individually introduced into three circuits of identical logic functions. In these circuits the signals imparted to inputs 50 and 52 in the form of second and third trains of signals are related to channel train input signals on 34, 36 and 38. Except for different internal cross connections between the first and the second logic functions, the three circuits are identical. The uppermost of the three circuits includes a first inverter 192, a first three-input NAND unit 194, a second three-input NAND unit 196 and a second inverter 198. These four functions are coupled by connectors 193, 195 and 197. An output connection 54 serves to deliver the signals enabled by its circuit. The other circuits with first inverters 202 and 212, and outputs 56 and 58, being identical to the uppermost channel except as noted above, warrant no further description.

The two inputs 50 and 52 from the signal generator 44 are introduced into the signal distributor unit 40 and conduct the second and third trains of signals thereto. The inputs 50 and 52 connect directly to a dual input NAND unit 225. An output connection 226 of the NAND unit 225 serves as an input to the first NAND units, 194, 204 and 214 of each of the three previously mentioned circuits.

In the illustrated embodiment, each of the three similar logic circuits processes the signals of its respective train of channel signals and the signals of the second and third trains of signals for its respective one of the controllable rectifiers in the rectifier unit 10, FIG. 1. The train of channel signals basically performs a permit/inhibit function with respect to the signals of the second and third trains of signals. By this action, the signal distributor of FIG. 5 renders firing signals to a controllable rectifier only when that controllable rectifier is conditioned to be safely conductive.

Figure 6:
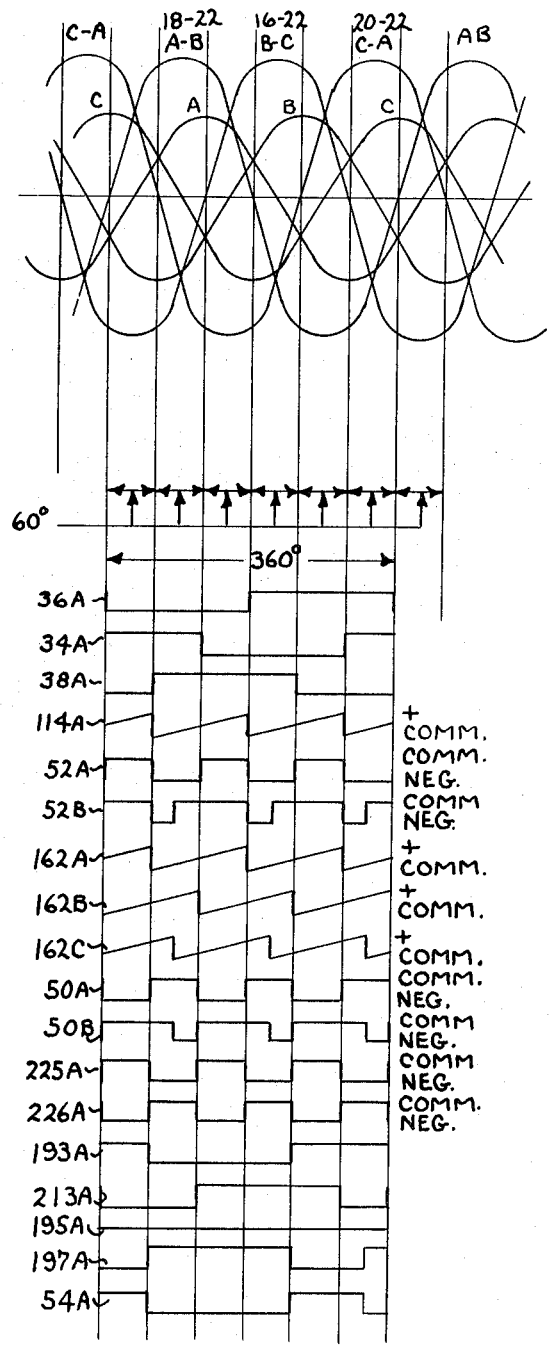
FIG. 6 in its various parts shows prevailing phase relationships and corresponding signal wave shapes at significant points in the signal generator and in the signal distributor unit.

FIG. 6 portrays graphically the forms which characterize the electrical signals developed at various points in the control system. Of significance equalling the characteristic forms is the relative timing of the signals. This aspect is also presented in FIG. 6 and must be heeded since it is vital to successful system operation.

The information represented in FIG. 6 is so closely allied with the ensuing description of system operation that its further consideration at this point is not warranted. It should be noted, however, that vertical dimensions are not necessarily to scale.

The operational description may be best understood by referring jointly to FIGS. 1, 3, 4, and 5. FIG. 6 portions will evolve as the description progresses.

CONTROL SYSTEM OPERATION

The a-c source inputs to the rectifier unit 10 and to the transformer 14 are identified as A, B and C, corresponding to the three phases represented. The transformer 14 has three phase output leads 16, 18 and 20 and a neutral lead 22. Phase correspondence between the transformer output leads 16, 18 and 20 as referenced to the neutral lead 22 and the a-c source inputs A, B and C is as follows: 16 to 22 corresponds to B–C; 18 to 22 corresponds to A–B; and 20 to 22 corresponds to C–A.

FIG. 6, Part A shows two separate and distinct three phase sine waves. The first three phase sine wave which has the lesser vertical magnitude depicts a common representation referenced to an electrical neutral. Individual alphabetic characters (A, B and C) corresponding to the three phases of the a-c source identify the sine waves of the phases. The second three phase sine wave, having the larger vertical magnitude, represents the corresponding phase-to-phase voltage and is of the form commonly used in analyzing rectifier circuitry. It will be noted that two hyphenated alphabetic characters are employed to indicate those phases between which the indicated voltage prevails. Thus, for example, the curve designated A–B is indicative of the potential which exists between phase A and phase B.

Directly below the sine waves just described is a time chart in terms of electrical degrees. The time chart portion of FIG. 6 is based on the second three phase sine wave which leads the first sine wave by an angle of 30 electrical degrees. As mentioned in the "Background," a controllable rectifier becomes conductive only when two prerequisites — a forward bias on the anode-cathode junction and the delivery of the gate electrode of a firing pulse during the forward bias condition — are met. Thus, timing in a controllable rectifier system is of utmost importance and a time chart becomes a necessity for system development and explanation.

Although no explanation is included herein with respect to the control of power supply 24, it being an item well known in the art, it should be noted that the common bus 26 is held at a voltage more positive than the neutral lead 22 by a voltage regulator in the power supply 24 as shown in FIG. 3.

Considering FIG. 3, when the transformer output lead 16 becomes positive with respect to the neutral lead 22, the diode 68 in the signal synchronizing unit 32 is forward biased. Under this condition the diode 68 becomes conductive, permitting a current to flow through the first and second resistors 62 and 64, respectively. The current flow through this circuit to the neutral lead 22 raises the voltage level on the base electrode 66 of the transistor 60. Transistor 60, of the NPN type, then becomes conductive and effectively connects its collector 72 to the neutral lead 22. This connection persists, maintaining the connection 34 at the voltage level of neutral lead 22 until such time as the voltage of transformer output lead 16 approximates the voltage of the neutral lead 22. When this latter relationship exists, the transistor 60 is unable to conduct, hence its collector 72 voltage level rises to the potential of the common bus 26.

When the collector 72 of the transistor 60 becomes positive with respect to the neutral lead 22, the diode 74 is back-biased and non-conductive. This permits connection 34 to rise to a voltage level approaching that of the common bus 26. This voltage level shift of connection 34 with respect to the neutral lead 22 is shown in FIG. 6, designated 34A.

The particular form of rectifier bridge used in this embodiment is of the well known semiconverter type which has three controllable rectifiers and three diode rectifiers as shown in 10 of FIG. 1. The controllable rectifiers are shown with their anodes connected to the negative bus. To achieve the full control range a controllable rectifier must have its instant of firing controllable throughout the 180 electrical degrees commencing when the phase associated with that controlled rectifier becomes the most negative of the three phases. This period is readily identified from line-to-line voltages also. For instance, referring to FIG. 6, it is apparent that phase C becomes the most negative at the same instant that voltage B–C becomes positive. Therefore the zone of firing for the controlled rectifier connected to phase C is that during which the voltage B—C is positive. This period is that in which the voltage of connection 34 is at its lower level as shown in 34A of FIG. 6.

In phase rotational sequence, the two remaining circuits of the signal synchronizing unit 32 FIG. 3 perform identically to that circuit just described. Transformer 14 output leads 18 and 20 establish 180° step-type signals on connections 36 and 38, respectively. These signals are designated 36A and 38A in FIG. 6, and together with the signal 34A become synchronizing channel signal trains for use in the signal distributor unit.

A signal, recurring once per cycle of the a-c source frequency is derived through the diode 80 for conduction through the connection 42 to the signal generator 44 FIG. 4. This signal, combined on the connection 42 with its counterparts which are derived through the two corresponding diodes 81 and 83 of the remaining two phases, becomes a frequency signal for the signal generator 44, FIG. 4. The frequency signal thus recurs once per phase per cycle of the a-c source, and is characterized by a spike form every 120 electrical degrees in a three phase embodiment. This frequency signal results from the aforementioned conductivity of the transistor 60 and its counterparts, the capacitor 82 and its companion capacitors in the other circuits contributing the spike form to the frequency signal. During its period of conductivity, the transistor 60 ties the connection 34 to the neutral lead 22, discharging the capacitor 84 and charging the capacitor 82.

Referring to FIG. 4, the connection 42 conducts the frequency signal developed through the diodes 80, 81 and 83 of FIG. 3 to the base electrode of the transistor 88 FIG. 4. Interconnections 28 and 30 supply, respectively, negatively and positively polarized d-c control power with reference to the common bus 26.

The positive voltage prevalent on the interconnection 30 establishes a forward bias on the collector 92-emitter 90 junction of the NPN-type transistor 88 and on the emitter 104-collector 106 junction of PNP-type transistor 102. This same positive voltage charges the capacitor 116 through the resistor 112 following the capacitor 116 discharge through the diode 94 and the transistor 88. The transistor 88 is rendered cyclically conductive by the frequency signal introduced through the connection 42. The cyclic operation of the transistor 88 causes the lead 114 and the transistor 102 to cycle at the same frequency. The lead 114 varies in potential levels between the limits established by the positive interconnection 30 and the common bus 26 as shown in FIG. 6, plot 114A. The build-up rate of the ramps in the plot 114A is dependent on the RC time constant determined by the values of the resistor 112 and capacitor 116. The cyclic frequency of the ramps, — one ramp per phase per cycle — is established by the frequency signal on the connection 42. The ramps on the lead 114 FIG. 4 together with the positive-going output of the resistor 108 and the contribution of the transistor 102 when it is made conductive by transistor 88 constitute one input to the first operational amplifier 110.

In addition to the composite signal just described on the lead 111 to the first operational amplifier 110, the lead 48 from the command signal source 46 of FIG. 1 introduces a command signal to influence the behavior of the first operational amplifier 110. This is accomplished by the modification of the conductivity of the transistor 117 by the command signal as the level of the command signal on the lead 48 is varied. The amplifier 110 is a standard item well known in the control system art and of itself warrants no explanation.

The command signal on lead 48, in the preferred embodiment, is a d-c voltage which is positive with respect to the common bus 26 when the system is operational. The conductivity of transistor 117 and consequently the voltage level of the conductor 127, is controlled by the command signal level. As the command signal level is increased, so also is the conductivity of the NPN-type transistor 117. By this increased conductivity, the voltage level of the conductor 127 is reduced to a value dependent on the value of the resistor 125, and the output of the first operational amplifier 110 is increased. It is apparent that a command signal could be introduced directly to the conductor 127. If this is done, however, an inverse proportionality will prevail between the command signal and the output of the first operational amplifier 110.

With respect to the application of the first operational amplifier 110, the following comments are pertinent. The ramp-type signal which is introduced through the lead 111 is applied to an inverting input. The command source signal conducted by the lead 48 and modified by the transistor 117 circuitry is applied to a non-inverting input through the conductor 127 and the resistor 133.

In the absence of a command signal on lead 48, the conductor 127 is maintained at a voltage level approaching that of the interconnecting positive bus 30. The value of signal level on the conductor 127 is determined by the values of resistors 119, 120, 121, 122, 123 and 125. This value is adjusted so that the first operational amplifier 110 is held normally in positive saturation except when it is briefly and cyclically switched to negative saturation by the operation of the transistor 102 which becomes conductive each time the ramp 114A resets. Conductivity of the transistor 102 effectively connects the lead 111 to the positive interconnection 30. As earlier mentioned, the lead 111 is introduced into the first operational amplifier 110 through its inverting input.

As a command signal on the lead 48 becomes increasingly positive, conductivity of the transistor 117 increases. This action progressively lowers the positive voltage level of the conductor 127. When the voltage level of the conductor 127 is exceeded by the ramp signal 114A, FIG. 6, the operational amplifier 110 switches to negative saturation. The operational amplifier 110 returns to positive saturation when the ramp 114A is reset and stays in that state until the ramp signal again reaches a value greater than the signal on conductor 127.

One output circuit of the first operational amplifier 110 is coupled through the resistor 126 to a parallel circuit. The parallel circuit, including the resistor 134 and 136, the capacitor 138 and the base 144-emitter 140 junction of the transistor 142 governs the response of the transistor 142 to the output of the first operational amplifier 110. The signal on the output connection 124 of the amplifier 110 triggers the transistor 142 into conduction. This lowers the potential of the output connection 52, connected to the collector 146 of the transistor 142, to that of the negative interconnection 28. The output connection 52, when the transistor 142 is non-conductive is at approximately the voltage level of the common bus 26. The capacitor 138 is incorporated to ensure that the rise of the transistor 142 output on the output connection 52 cannot precede the fall of the transistor 182 output on the output connection 50. Curve 52A in FIG. 6 depicts a typical output signal of the transistor 142 of FIG. 4 when the command signal is of a finite but less than full value. Curve 52B indicates the output signal when the command signal is at full value. A phase shift of 90 electrical degrees has, however, been imparted to the signal 52B as compared to the output which prevails in the absence of a command signal.

A second output circuit of the first operational amplifier 110 is directed from the output connection 124 through a differentiating circuit including the resistor 132 and the capacitor 130 to a junction between the diode 150 and the resistor 152. The diode 150 is so polarized that until the aforementioned second output becomes negative in polarity with respect to the common bus 26, conduction is impossible. When the first operational amplifier 110 output does become negative, the transistor 156 is made conductive, being of the PNP type. The base 154 of the transistor 156 responds to the negatively polarized second output and the emitter 160-collector 158 junction of the transistor 156 effectively ties the lead 162 to the common bus 26. This results in the discharge of the capacitor 164. When the transistor 156 is made non-conductive by the absence of the negatively polarized second output, the capacitor 164 accepts a charge through resistor 166 and in so doing creates a ramp voltage on the lead 162. This ramp voltage is shown in FIG. 6, and numbered 162 with alphabetic designations to denote the following conditions of the command signal: 162A corresponds to and occurs when no command signal is provided on the lead 48 of FIG. 4; 162B is created when a command signal of intermediate level prevails and; 162C indicates the relative timing of the ramp when a full command signal is impressed. A reset of this ramp generator for each period of conduction of the transistor 88 FIG. 4 is assured by the cyclic saturation of the first operational amplifier 110 and its second output circuit. In common with the previously discussed plot of the ramp 114A FIG. 6 which is generated in the lead 114, FIG. 4, the ramps which evolve on the lead 162 vary between limits established by the common bus 26 and the positive interconnection 30.

Comparing the plots 162A, B and C of FIG. 6, in detail, it will be noted that as the level of the command signal increases, the points of transition of the ramps from positive to common shift with respect to the sine waves. This shift in timing, often referred to as a phase shift, is 60° in the case of plot 162B, and 90° for 162C. This phase shift is accomplished in the first operational amplifier 110 of FIG. 4 and provided on the output connection 124 of the first operational amplifier 110. This advance in timing is reflected in the plot 52B of FIG. 6 which was discussed in earlier paragraphs.

The ramps represented by the plots 162A, 162B and 162C are conducted to the second operational amplifier 118 FIG. 4 through the resistor 172. As in the case of the first operational amplifier 110, the second operational amplifier 118 processes a combination of ramps and the output of the transistor 117 to yield a cyclic, rectangular output. This output is impressed on the output resistor 178 to govern therethrough the transistor 182. The operation of this signal generating circuit including the second operational amplifier 118 and the transistor 182 so closely matches that of the earlier described circuit which includes the first operational amplifier 110 and the transistor 142 that elaboration is not warranted.

Signals generated in the transistor 182 in response to the output of the second operational amplifier 118 are impressed on the output connection 50. These signals recur in response to the ramps 162A, 162B and 162C of FIG. 6, and are shown in FIG. 6, identified as 50A and 50B. As was true with respect to the plots 52A and 52B, the plots 50A and 50B also operate between the limits of the negative interconnection 28 FIG. 4 and the common bus 26. As in the case of plots 52A and 52B, FIG. 6, plot 50A depicts the block signals developed with a command signal of less than full magnitude. Plot 50B shows the block signals developed when a 100 percent command signal prevails.

As explained earlier in this specification, and as portrayed in FIG. 6 in the plot 52B, a 90° phase shift is provided the block signal on the output lead 52 FIG. 4 when a 100 percent command signal is present. The initiating signal which is present on the output connection 124 of the first operational amplifier 110 provides the 90° phase shift to the transistor 156-generated ramp 162C of FIG. 6. In developing its output in response to the 100 percent command signal the second operational amplifier 118 of FIG. 4 provides an additional phase shift of 90°. This is cumulative with the first phase shift and after processing by the transistor 182, provides a total potential phase shift of 180°. A shift of this magnitude is difficult to portray in a chart such as FIG. 6, but the plot identified as 50B manifests such a phase shift. As indicated in FIG. 1, the output connections 50 and 52 of the signal generator 44 convey the signals to the signal distributor unit 40, detailed in FIG. 5. The unit 40 is responsive to both of the square-wave signals and to the previously mentioned synchronizing channel signals.

Before an analysis of FIG. 5 is undertaken, explanatory remarks on the logic therein employed are in order. A cursory inspection reveals two types of logic symbols, both present in quantity. In the upper circuit of FIG. 5 one functional symbol is identified as 194. This is commonly known as a three-input NAND gate and is characterized by the requirement that all inputs must be of the "H" sense to achieve an output of the "L" sense. Any other combination of inputs yields an output of the "H" sense. In common usage the term "sense", as applied to logic of this type, refers to different d-c voltage levels. For example, one sense may be represented by a positive voltage of a finite value, say 5 volts, and the opposite sense may be represented by ground potential or 0 volts. These senses are often identified as "H" and "L", the "H" corresponding to the assumed value of 5 volts and the "L" corresponding to ground potential. In the ensuing description, the senses "H" and "L" are used in this context.

Referring again to FIG. 5, and specifically to the NAND gate 194, the small circle indicates that the output of gate 194 to the connector 195 will be of the sense opposite that of the inputs when all three inputs are of one sense. Thus, if the three inputs to the gate 194 are all of the "H" sense, the output will be of the "L" sense. Under any other input conditions, the output will be of the "H" sense.

The second logic function employed is represented by a triangle. As in the case of the NAND gates just discussed, the small circle at the right of the symbol indicates that an output therethrough will be of the sense opposite that of an input. This type of gate is referred to as a NOT gate and merely inverts the sense of its output with respect to its input. In the upper circuit of FIG. 5, such a NOT gate is identified by the numeral 198. If a signal on the connector 197 is of the "H" sense, for example, the signal on the output connection 54 will be of the "L" sense, and vice-versa.

For the sake of clarity in FIG. 5, the common bus 26 and the negative interconnection 28 of FIG. 1, are not shown. These d-c potentials are required to establish operating levels of the logic functions of FIG. 5. Their application to logic networks is well known in the art, hence elaboration herein is not merited.

Returning to FIG. 1, it will be noted that the governing inputs to the signal distributor unit 40 are derived from the signal synchronizing unit 32 and the signal generator 44. The information required from the signal synchronizing unit 32 is introduced into the signal distributor unit 40 by the connections 34, 36 and 38. The signals developed in the signal generator 44 are conducted in second and third trains of signals by output connections 52 and 50 respectively to the signal distributor unit 40.

Continuing the control system analysis with reference to FIG. 5, the aforementioned inputs to the signal distributor logic network 40 are shown entering at the left of FIG. 5. The three connections 34, 36 and 38 are each introduced into individual logic circuits. Since each of the three circuits functions identically with respect to its related phase A, B or C FIG. 1 of the a-c source, only the uppermost of the circuits will be discussed in detail. This circuit includes as its first element, a NOT gate 192. The connector 193 conducts the output of the NOT gate 192 to one input of the first three-input NAND gate 194 which renders its output on the connector 195. The connector 195 introduces the output of the first three-input NAND gate 194 into the second three-input NAND gate 196. The output of NAND gate 196 is fed through the connector 197 to a second NOT gate 198, whence the output connection 54 delivers the resultant pulse. As mentioned earlier, this pulse may be directed to a pulse amplifier or connected directly to the respective controllable rectifier of the rectifier unit 10, FIG. 1, as dictated by the requirements of the controllable rectifiers.

Continued consideration and further evaluation of FIG. 6 are required in conjunction with the following discussion of operational details of FIG. 5.

Both output connections 50 and 52 of the signal generator 44 of FIG. 4 are introduced into the dual-input NAND gate 225. A determination of the characteristics of the output of the gate 225 on its output connection 226, requires the assumption of a command signal level and of a combination of the signals of the second and third trains of signals delivered to the dual-input NAND gate 225.

A controllable rectifier employed in a configuration such as shown in the rectifier unit 10, FIG. 1 should be enabled to be conductive throughout an angle which exceeds 120° if maximum conversion of a-c power to d-c power is to be realized. For this reason, a 100 percent command source signal will be assumed, and the plots of FIG. 6 corresponding to the 100 percent level of signal will form the basis for the operation of the logic into which those signals are introduced.

It will be recalled that the plots 52B and 50B of FIG. 6 represent, respectively, the signals of the second and third trains of signals on the output connections 52 and 50 of the block signal generator 44 when a 100 percent command signal is employed. Keeping the operation of a NAND gate in mind, reference to the plots 52B and 50B indicates that the potential level of the common bus may be termed the "H" sense.

Similarly, the "L" sense may be ascribed to the negative potential shown. By combining the plots 52B and 50B the plot 225A may be established, indicating the operation of the NAND gate 225. Since a NAND gate includes an inversion, the plot 226A represents the output of the gate 225 on its output connection 226. As mentioned with respect to FIG. 4, the signal generator output connection 52 signal is shifted 90° as portrayed by the plot 52B. Similarly, the output connection 50 signal is shifted an additional 90° for a total of 180° with respect to the sine waves of FIG. 6. This 180° shift is, of course, carried through to the plots 225A and 226A derived from and dependent on 52B and 50B. It will be noted that the signal represented by the plot 226A is introduced into each of the three circuits of logic through the NAND gates 194, 204 and 214.

Also introduced into the gates 194, 204 and 214 of their respective circuits are the inversions of the channel signals represented in FIG. 6 by the plots 34A, 36A and 38A. The inversions are provided by the NOT gates 192, 202 and 212, and govern the distribution of the processed signals of the second and third trains of signals to the firing circuits as will be seen.

Returning to the consideration of the upper circuit of FIG. 5, the inversion of the signal plotted in 38A FIG. 6 as it appears on the connector 193 of FIG. 5 is shown in FIG. 6 and identified therein as 193A. A third signal introduced into the gate 194, FIG. 5 and present on the conductor 213 is an inversion of the plot 34A FIG. 6, shown in FIG. 6 as plot 213A. Thus, the NAND gate 194 FIG. 5 signal inputs are represented by the three plots 226A, 193A and 213A in FIG. 6 which together determine the sense and nature of the output of NAND gate 194.

The output of the NAND gate 194 on the connector 195 is shown in FIG. 6 as 195A. It will be noted that the three inputs to the NAND gate 196 FIG. 5 include those introduced by the connectors 193, 195 and 233. In FIG. 6, these are represented, respectively, by the plots numbered 193A, 195A and 50B. The characteristic of the signals on connection 233, as is apparent from FIG. 5, is the same as that which prevails on the connection 50, as present in the third train of signals. This input 50B FIG. 6 incorporates the 180° phase shift with respect to the corresponding a-c sine wave. Combining the signals 193A, 195A and 50B of FIG. 6 in the NAND gate 196, FIG. 5 within the prescriptions of such a gate yields a signal represented by the plot 197A FIG. 6 on the connector 197 FIG. 5. Following an inversion of the plot 197A in the inverter 198, FIG. 5, the signal emerges as indicated by the plot 54A of FIG. 6 for a 180° firing angle of its controllable rectifier or for amplification if needed. The two remaining logic circuits in FIG. 5 operate identically with respect to their related a-c source phases as the circuit just analyzed.

It should be noted that the combinations of signals processed in the logic of the signal distributor unit 40 FIG. 5 provide several features. A combination of the signals represented in FIG. 6 as 38A and 34A provide a firing signal having a 120° phase advance range. The combination of signals represented by 52B and 50B of the second and third trains of signals in the gate 225, FIG. 5 serves to suppress the nullifying effect of the signals shown as 38A and 34A of the channel signals to permit the firing signals to be advanced beyond the 120° phase shift to as much as a 180° firing angle.

This invention is not limited to the specific details of the preferred embodiment illustrated. It is contemplated that many changes to and modifications of this embodiment will occur to those skilled in the art. For example, in the signal generator 44 of FIG. 4 the transistor 117 together with its circuitry may be omitted if the lead 48 from the command signal source 46 FIG. 1 is connected directly to the conductor 127. If this arrangement is used, an inverse rather than a direct proportionality between the magnitude of the command signal and the extent of the phase shift will prevail but the system operation will otherwise be as described for the preferred embodiment. Use of an amplifier for the firing signals is a modification to be considered if large controllable rectifiers are required to provide needed system capacity, or if a plurality of controllable rectifiers, to be fired simultaneously, is used to yield higher capacity.

It is, therefore, intended that the appended claims cover all such changes, additions, and modifications as fall within the true spirit and scope of this invention.

What is claimed as new and is desired to secure by Letters Patent of the United States is:

1. In a static power conversion system for converting alternating current electric power to direct current electric power including at least one separately controlled load current carrying controllable rectifier for each phase of the alternating current electric power source, the level of direct current electric power output to a load being determined by the firing angle of the controllable rectifiers, control means for controlling the firing angle comprising:

means for generating a command signal proportional to a desired level of direct current power output, means connected to the alternating current power input and being responsive thereto for generating a first train of signals at a frequency equal to the product of the frequency of the alternating current power input and the number of separately controlled rectifiers and for generating a plurality of channel signal trains of signals at the frequency of the alternating current power input, there being as many channel signal trains as there are separately controlled rectifiers, means connected to receive the command signal and said first train of signals and being responsive thereto for generating second and third trains of signals, the signals of said second train being generated at the same frequency as the signals of said first train and being offset in time relative to the signals of said first train by an amount proportional to the magnitude of said command signal and the signals of said third train being generated at the same frequency as the signals of said first and second trains and being offset in time relative to the signals of said second train by an additional amount proportional to the magnitude of said command signal, means connected to receive said channel signal trains and said second and third signal trains and being responsive thereto for directing a plurality of trains of firing pulses to said controllable rectifiers, each train of firing pulses being directed to a respective controllable rectifier at the frequency of a respective one of said channel signal trains and the firing pulses of said firing pulse trains being offset in time relative to the signals of said respective channel signal train by an amount determined by the amount of cumulative time offset of the signals of said second and third signal trains, whereby the level of direct current electric power output is determined by the magnitude of said command signal.

2. Control means as defined by claim 1 wherein the signals of the channel signal trains are generated in predetermined synchronization with respective phases of the alternating current power source and wherein the first train of signals includes signals generated in synchronization with all signals of the channel signal trains, said means for receiving said channel signal trains and said second and third signal trains and for directing said trains of firing pulses to the separately controlled rectifiers further comprising:

means responsive to said second and third signal trains for producing a fourth train of signals, the signals of said fourth train being generated at the same frequency as the signals of said first, second, and third trains and being offset in time relative to the signals of said first train and the corresponding signals of said channel signal trains by an amount equal to the cumulative time offset of the signals of said second and third signal trains, and a logic network, said logic network including a plurality of channel signal train input means each connected to receive a selected one of said trains of channel signals, a plurality of firing pulse output means each connected to deliver a train of firing pulses to a respective separately controlled rectifier, and fourth signal train input means, said logic network being responsive to the signals of said channel signal trains and said fourth signal train to produce the trains of firing pulses.

3. Control means as defined by claim 2 wherein said means responsive to the alternating current power input for generating a first train of signals and for generating a plurality of channel signal trains of signals in predetermined synchronization with respective phases of the alternating current power source further comprises means for discriminating between positive and negative portions of the wave form of the respective phases of the alternating current power source and for generating the signals in said channel signal trains during only one of the portions of the wave form to establish the predetermined synchronization.

4. Control means as defined in claim 1, wherein the offset in time of the signals of said second train relative to the signals of said first train, and the further offset in time of the signals of said third train relative to the signals of said second train are substantially equal.

5. Control means as defined in claim 4, wherein the cumulative offset in time of the signals of said third train relative to the signals of said first train may be adjusted over a range extending from 0 electrical degrees to 180 electrical degrees in response to variations in the magnitude of the command signal such that the firing angles of the controlled rectifiers are varied through 180 electrical degrees.

6. Control means as defined by claim 5 wherein said means for generating said second and third trains of signals further comprises means responsive to said first train of signals for generating a first train of ramp signals in synchronization with said first train of signals, means responsive to said first train of ramp signals and the command signal for generating said second train of signals and a second train of ramp signals in synchronization with said second train of signals, and means responsive to said second train of ramp signals and the command signal for generating said third train of signals.

7. In an adjustable speed d-c drive system including a d-c motor and at least one separately controlled load current carrying controllable rectifier for each phase of an alternating current power source for converting alternating current electric power to direct current electric power for supply to the motor, the firing angle of the separately controlled controllable rectifiers establishing the operating speed of the d-c motor, motor control means comprising:

means for generating a command signal proportional to a desired level of motor speed, means connected and responsive to the alternating current power input for generating multiple signals at frequencies related to the frequency of the alternating current power input, the multiple signals including a first train of signals at a frequency equal to the product of the frequency of the alternating current power input and the number of separately controlled controllable rectifiers and a plurality of trains of channel signals at the frequency of the alternating current power input, there being as many channel signal trains as there are separately controlled rectifiers, means connected to said command signal generating means and to said multiple signal generating means for receiving and being responsive to the command signal and the signals of said first train of signals for generating second and third trains of signals at the frequency of said first train of signals, the signals of said second and third trains of signals each shifted by a finite time element with respect to the signals of said first train of signals, the finite time element of each of said second and third trains being proportional to the magnitude of said command signal, and means connected to said multiple signal generating means and said second and third signal train generating means and responsive to said channel signals and the signals of said second and third trains of signals for directing trains of firing pulses to the controllable rectifiers at the frequency of respective ones of said trains of channel signals, the firing pulses being shifted relative to the respective channel signals by a finite time element equal to the total of the finite time elements of said second and third trains of signals.

* * * * *